(12) United States Patent
Onishi (10) Patent No.: US 6,972,506 B2
(45) Date of Patent: Dec. 6, 2005

(54) STATOR OF DYNAMO-ELECTRIC MACHINE

(75) Inventor: Kazuyoshi Onishi, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/806,170

(22) Filed: Mar. 23, 2004

(65) Prior Publication Data

US 2004/0189134 A1 Sep. 30, 2004

(30) Foreign Application Priority Data

Mar. 28, 2003 (JP) .............................. 2003-089511

(51) Int. Cl.$^7$ ........................................... H02K 15/10
(52) U.S. Cl. ..................................................... 310/215
(58) Field of Search ................................ 310/215, 201

(56) References Cited

U.S. PATENT DOCUMENTS

| | | | |
|---|---|---|---|
| 2,407,935 A | * | 9/1946 | Perfetti et al. .............. 310/201 |
| 6,147,430 A | * | 11/2000 | Kusase et al. .............. 310/215 |
| 6,242,836 B1 | * | 6/2001 | Ishida et al. ................ 310/215 |
| 6,609,289 B2 | * | 8/2003 | Naka et al. .................... 29/596 |
| 6,674,211 B2 | * | 1/2004 | Katou et al. ................ 310/215 |
| 2004/0263021 A1 | * | 12/2004 | Irwin et al. ................ 310/215 |

FOREIGN PATENT DOCUMENTS

JP A 2001-178057 6/2001

* cited by examiner

*Primary Examiner*—Tran Nguyen
(74) *Attorney, Agent, or Firm*—Oliff & Berridge, PLC (57) ABSTRACT

A stator 3 of an on-vehicle AC generator 1 denoting a dynamo-electric machine has a stator core 32 having slots 35 arranged in a line along a circumferential direction of the stator core 32, electric conductors which are inserted into the slots 35 to be protruded from an end surface of the stator core 32 in an axial direction of the stator core 32 and of which portions protruded from an end surface of the stator core 32 in an axial direction of the stator core 32 are bent in the circumferential direction, and an electric insulating member 34 which is arranged between an inner wall of each slot 35 of the stator core 32 and a peripheral surface of the electric conductor so as to surround the electric conductor and has at least two duplicate layers 34A and 34B formed by duplicating the electric insulating member 34.

6 Claims, 7 Drawing Sheets

STATOR OF DYNAMO-ELECTRIC MACHINE

BACKGROUND OF THE INVENTION

1. Field of the Invention

The present invention relates to a stator of a dynamo-electric machine such as an on-vehicle alternating current (AC) generator or the like mounted on an automobile or an auto truck.

2. Description of Related Art

An insulator (electric insulating member) surrounding electric conductors is conventionally used for a stator of an on-vehicle AC generator to electrically insulate the electric conductors from a stator core. When electric conductors protruded from one end surface of a stator core are bent toward a circumferential direction of the stator core to produce a wiring from the electric conductors, there is a probability that an insulator of electric conductors inserted into a slot of the stator core is broken by pushing and opening closed end portions of the insulator in the circumferential direction. To prevent the insulator from being broken, a stator of an on-vehicle AC generator is known in which a slit is formed in a portion of an insulator of each slot of the stator core (for example, refer to pp. 3 and 4 and FIGS. 1 to 9 of Published Unexamined Japanese Patent Application 2001-178057). In this Patent Application, a slit extending in the axial direction of a stator core is formed between end portions of each insulator. Therefore, even though electric conductors adjacent to each other along a radial direction of the stator core in a slot of the stator core are bent in circumferential directions of the stator core opposite to each other, the entire end portions of the insulator are not forcibly pushed and opened, but only a part of the end portions of the insulator necessary to be further opened is pushed and further opened. Accordingly, the breakage of the end portions of the insulator can be prevented.

However, the slit is formed between the end portions of the insulator in the conventional stator of the on-vehicle AC generator, a portion of the electric conductor placed near to the slit approach the stator core through the slit. Therefore, the electric conductor is easily short-circuited with the stator core, and a problem has arisen that the electric conductors of the stator cannot be sufficiently insulated from the stator core. Further, the length of the slit is sometimes shortened to secure some better electric insulation between each electric conductor and the stator core. However, because the top of the slit is placed outside of the end surface of the stator, another problem has arisen that end portions of the insulator placed at the top of the slit are easily broken due to the bending of the electric conductors.

SUMMARY OF THE INVENTION

An object of the present invention is to provide, with due consideration to the drawbacks of the conventional stator of the on-vehicle AC generator, a stator of a dynamo-electric machine in which electric insulation between an electric conductor and a stator core is secured.

The object is achieved by the provision of a dynamo-electric machine's stator comprising a stator core having a plurality of slots which are arranged in a line along a circumferential direction of the stator core, a plurality of electric conductors which are inserted into the slots of the stator core so as to be protruded from an end surface of the stator core in an axial direction of the stator core and of which portions protruded from the end surface of the stator core are bent in the circumferential direction, and an electric insulating member which is arranged between an inner wall of each slot of the stator core and a peripheral surface of the corresponding electric conductor so as to surround the electric conductor and has at least two duplicate layers each of which is formed by duplicating the electric insulating member.

Therefore, even though the electric insulating member of one slot is pushed and forced to be spread in the circumferential direction by bending the electric conductor of the slot protruded from the end surface of the stator core in the circumferential direction, portions of the electric insulating member duplicated in each duplicate layer are shifted to spread the electric insulating member in the circumferential direction.

Accordingly, the electric insulating member is not broken. Further, because the duplicated portions of the electric insulating member are merely shifted without forming an open area in the electric insulating member, the electric conductor facing the stator core through the duplicate layer does not approach the stator core, no electric conductor is short-circuited with the stator core, and the electric insulation between the electric conductor and the stator core can be secured.

Preferably, each electric insulating member comprises a plurality of sheet members separated from one another at positions of the duplicate layers. Therefore, the electric insulating member configured by combining the sheet members formed in a simple shape and inserted into the slot can be easily produced. Accordingly, the stator can be easily manufactured due to the simplification of the shape of parts, and cost of parts of the stator can be reduced.

Preferably, each duplicate layer of each electric insulating member is formed by folding a sheet member. Accordingly, the electric insulating member can be reliably placed between the electric conductor and the stator core, and the electric insulation can be further reliably secured.

Preferably, the electric conductor inserted into each slot of the stator core is formed in a rectangular shape in section, and the two duplicate layers of the electric insulating member of the slot are placed at positions at which the peripheral surface of the electric conductor is equally divided into two. Therefore, two portions of the electric insulating member partitioned by the two duplicate layers have the almost same length as each other, and portions of the electric insulating member duplicated in each duplicate layer can be almost equally shifted when the electric conductor is bent.

Accordingly, the breakage of the electric insulating member in the duplicate layers can be further prevented. Further, when the electric insulating member is formed out of two sheet members, the sheet members can have the same shape as each other, and the production of the electric insulating member can be simplified.

Preferably, the duplicate layers of each electric insulating member are placed at positions respectively facing an inner circumferential surface of the stator core and an outer circumferential surface of the stator core.

Accordingly, portions of the electric insulating member partitioned by the duplicate layers can be almost equally pushed and spread in the circumferential direction while securing the electric insulation.

DETAILED DESCRIPTION OF THE PREFERRED EMBODIMENTS

Embodiments of a stator of an on-vehicle AC generator according to the present invention will now be described with reference to the accompanying drawings.

(First Embodiment)

Figure 1:
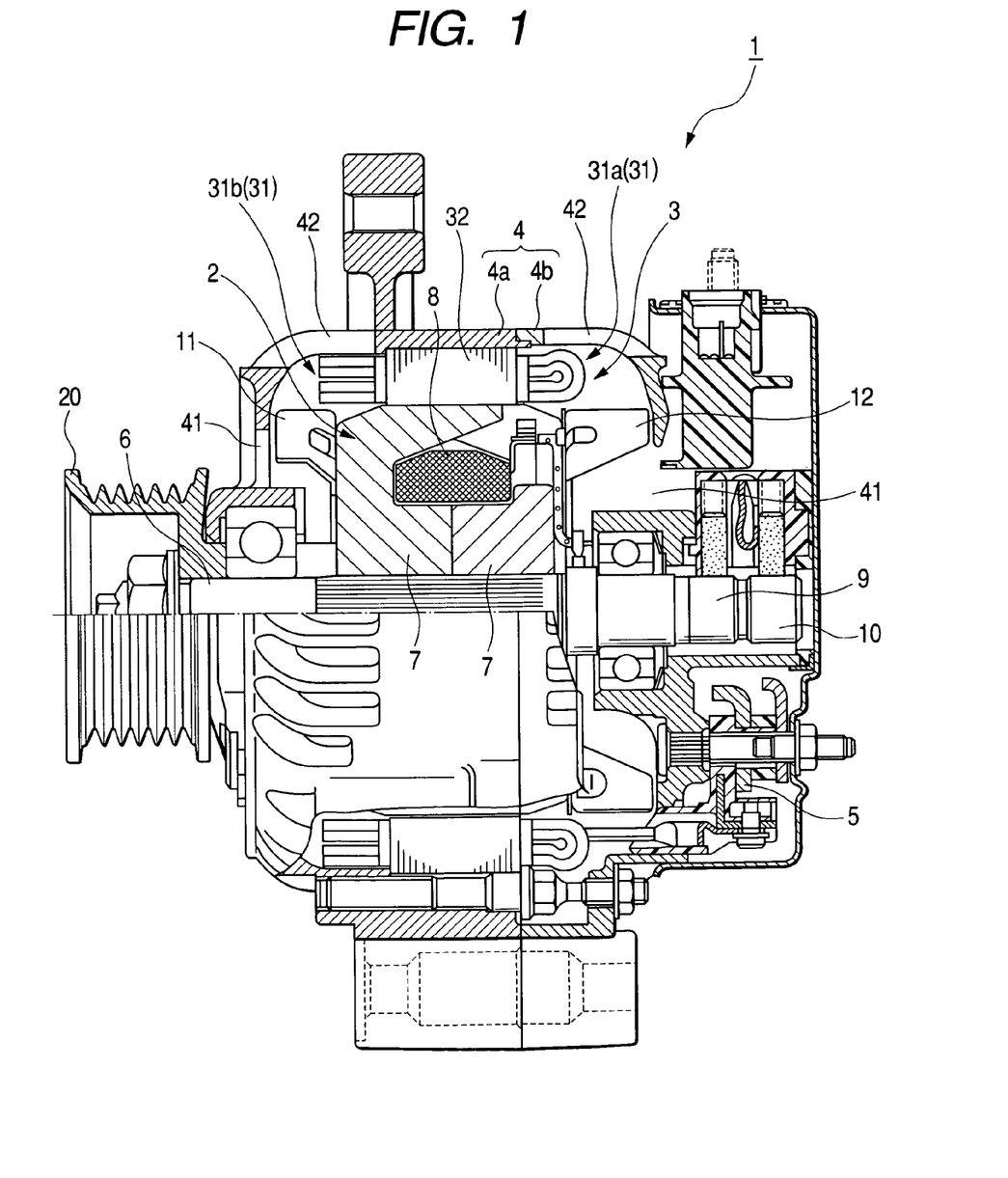
FIG. 1 is a sectional view showing the entire configuration of an on-vehicle AC generator according to a first embodiment of the present invention.

FIG. 1 is a sectional view showing the entire configuration of an on-vehicle AC generator according to a first embodiment of the present invention. As shown in FIG. 1, an on-vehicle AC generator 1 representing a dynamo-electric machine according to the embodiment comprises a rotator 2, a stator 3, a housing 4 and a rectifier 5.

The rotator 2 generates a magnetic field and is rotated with a shaft 6. The rotator 2 comprises a Lundell type pole core 7, a magnetic field coil 8, slip rings 9 and 10, a mixed flow fan 11 used as an air blower and a centrifugal fan 12. The shaft 6 is connected to a pulley 20 and is rotationally driven by a running engine (not shown) mounted on a vehicle.

The housing 4 comprises a front housing 4a and a rear housing 4b. A supply opening 41 is arranged on an end surface of the housing 4 in its axial direction. Exhaust openings 42 for cooling wind are respectively arranged on both shoulders of the outer circumference of the housing 4. One exhaust opening 42 is placed on the outside of a group of first coil ends 31a of the stator 3 in a radial direction of the housing 4, and the other exhaust opening 42 is placed on the outside of a group of second coil ends 31b of the stator 3 in the radial direction.

The rectifier 5 performs rectification by converting an AC voltage output from the stator 3 to a direct current voltage. The rectifier 5 is arranged on an end of the on-vehicle AC generator 1 placed on the opposite side to the pulley 20.

Figure 2:
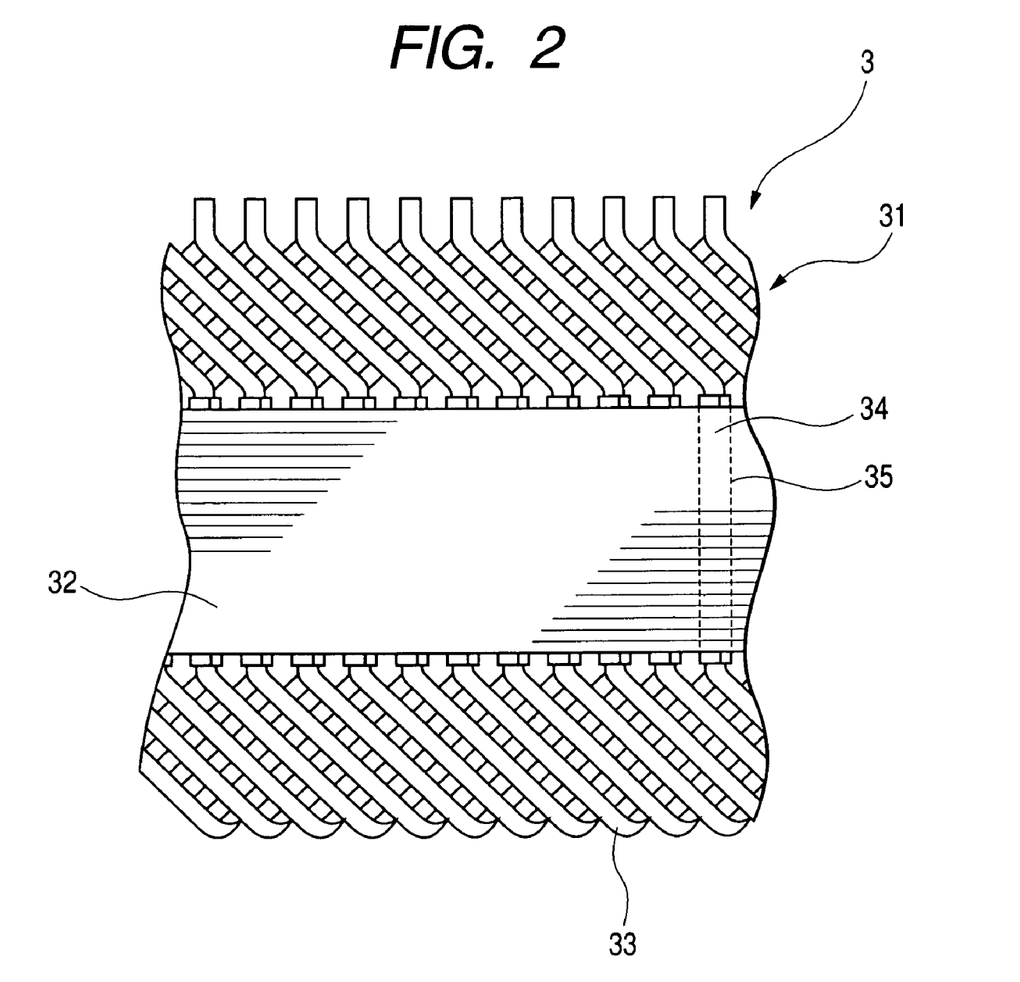
FIG. 2 is an unfolded view of a stator seen from the outside.
Figure 3:
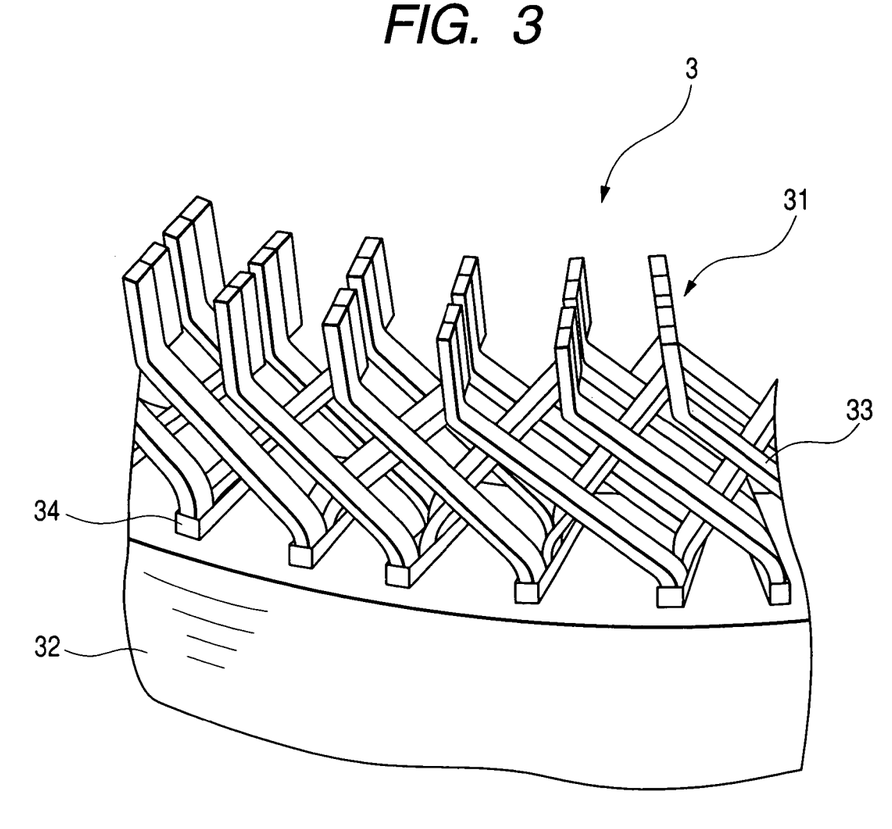
FIG. 3 is a partial perspective side view of the stator.

The stator 3 will be described in detail. FIG. 2 is an unfolded view of the stator 3 seen from the outside. FIG. 3 is a partial perspective side view of the stator 3 and shows bent electric conductors seen from a front side of the on-vehicle AC generator 1 (a side opposite to a side of the rectifier 5).

The stator 3 comprises a stator core 32 formed by laying a plurality of thin steel plates one on top of another, a stator winding 31 received in a plurality of slots 35 of a stator core 32 for each phase, and a plurality of insulators 34 acting as electric insulating members and arranged between the stator winding 31 and the stator core 32.

The stator winding 31 comprises a plurality of U-shaped segment conductors 33 connected to each other. A pair of straight portions of each U-shaped segment conductor 33 is inserted into two corresponding slots 35 of the stator core 32 apart from each other by a predetermined pitch so as to be protruded from one side surface of the stator core 32 in the axial direction of the stator core 32. The top portions of the segment conductor 33 protruded from the stator core 32 are respectively bent to predetermined positions along circumferential directions of the stator core 32 opposite to each other. Each bent top portion of each segment conductor 33 is connected to a bent top portion of the other segment conductor 33 so as to form a conductive line composed of the segment conductors 33. Therefore, the stator winding 31 is formed for each phase to obtain multi-phase windings.

Figure 4:
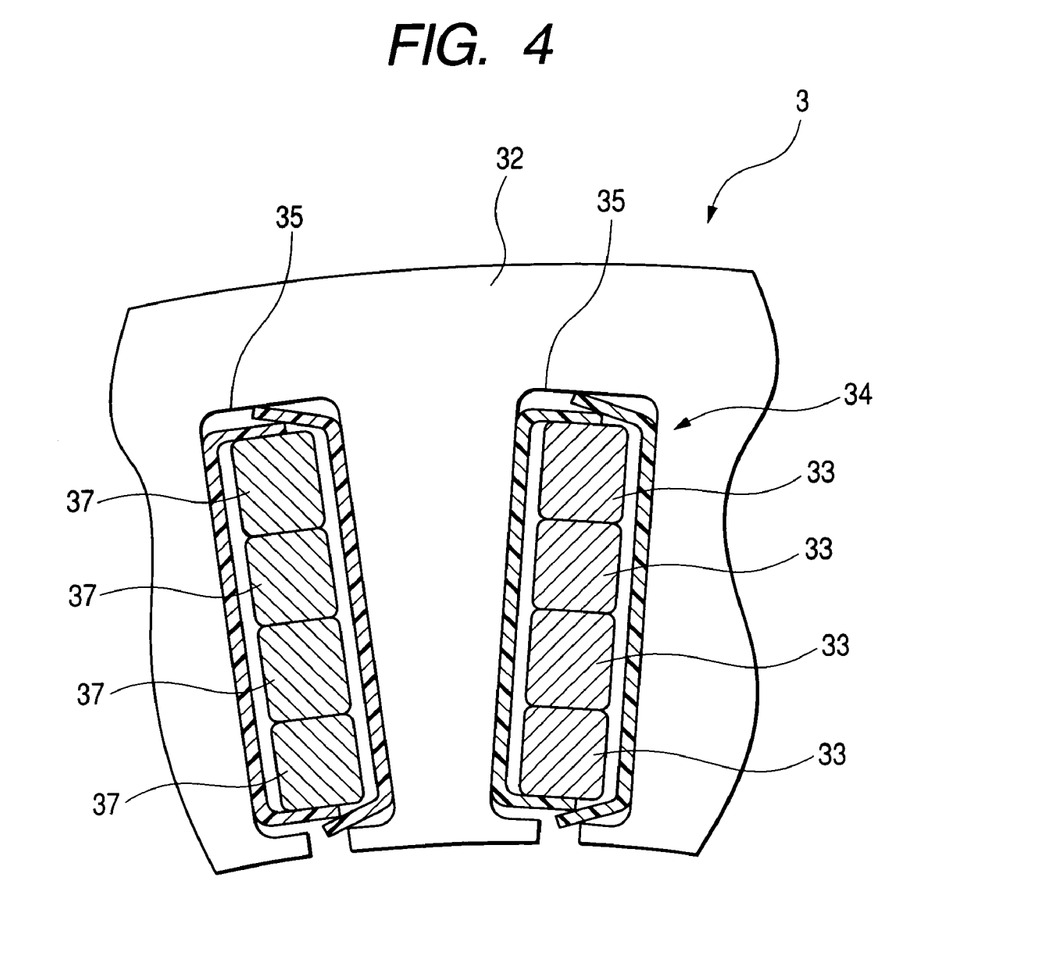
FIG. 4 is a partial sectional view of the stator.
Figure 5:
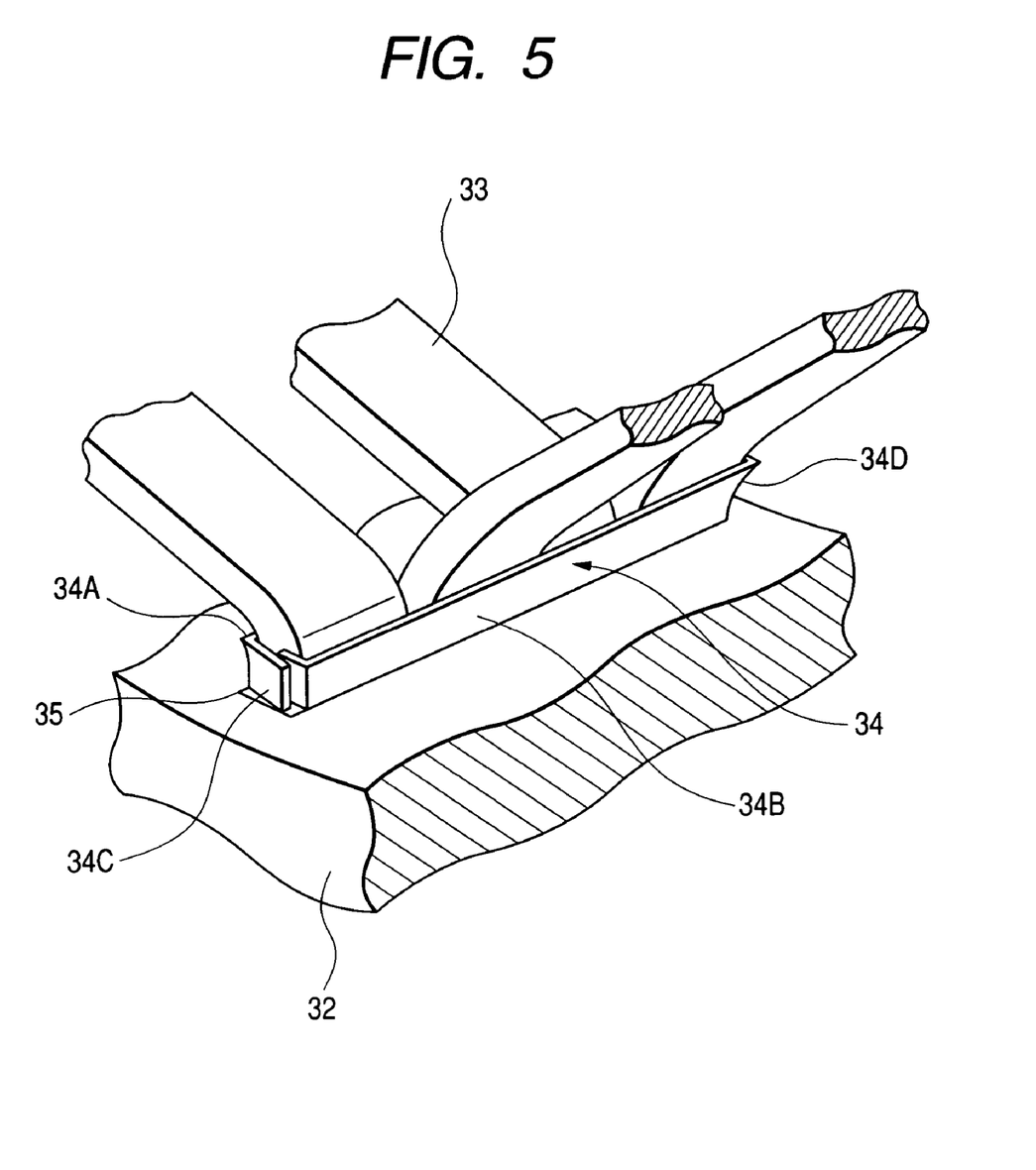
FIG. 5 is a partial perspective side view showing a shape of an insulator protruded from a stator core.

FIG. 4 is a partial sectional view of the stator 3. FIG. 5 is a partial perspective side view showing a shape of one insulator 34 protruded from the stator core 32.

As shown in FIG. 4, each of the segment conductors 33 received in the slots 35 of the stator core 32 can be grasped as a pair of electric conductors, and even-numbered electric conductors (in this embodiment, four electric conductors) are received in each slot 35. The four electric conductors in each slot 35 are arranged in a line in the radial direction of the stator core 32 and are respectively placed in an inner end layer, an inner intermediate layer, an outer intermediate layer and an outer end layer in the direction from the inside (an open side of the slot 35 facing the inner circumferential surface of the stator core 32) to the outside (a closed side of the slot 35 facing the outer circumferential surface of the stator core 32) of the stator core 32. The insulator 34 is arranged between the inner side wall of each slot 35 and a group of corresponding four electric conductors so as to cover the four electric conductors along the inner side wall of the slot 35. Each electric conductor is coated with a coating material such as polyamideimide or the like to form an insulating coat 37 on the surface of the electric conductor.

As shown in FIG. 5, the insulator 34 of each slot 35 is arranged so as to be protruded from each of both end surfaces of the stator core 32 by a predetermined length in the axial direction of the stator core 32. Therefore, the electric insulation between the group of electric conductors protruded from each slot 35 and the stator core 32 can be secured by the insulator 34 of the slot 35. Each insulator 34 is configured by combining two divisional insulators 34A and 34B acting as two sheet members. The divisional insulators 34A and 34B of each slot 35 are separated from each other at an open area of the slot 35 facing the inner circumferential surface of the stator core 32 and in the neighborhood of the side wall of the slot 35 facing the outer circumferential surface of the stator core 32. Each of the divisional insulators 34A and 34B is formed in an almost C-shape so as to have a long straight portion between two end portions.

The divisional insulator 34A of each slot 35 covers one entire side surface of the four electric conductors of the slot 35 facing toward one circumferential direction, a half and additional area of one side surface of the electric conductor of the inner end layer of the slot 35 facing the inner circumferential surface of the stator core 32 and a half and additional area of one side surface of the electric conductor of the outer end layer of the slot 35 facing the outer circumferential surface of the stator core 32. The divisional insulator 34B of each slot 35 covers the other entire side surface of the four electric conductors of the slot 35 facing toward the other circumferential direction, a half and additional area of one side surface of the electric conductor of the inner end layer of the slot 35 facing the inner circumferential surface of the stator core 32 and a half and additional area of one side surface of the electric conductor of the outer end layer of the slot 35 facing the outer circumferential surface of the stator core 32.

Therefore, the divisional insulators 34A and 34B are laid to overlap each other at duplicate layers 34C and 34D of the divisional insulators 34A and 34B. The duplicate layer 34C of the divisional insulators 34A and 34B is placed on a side surface of the electric conductor of the outer end layer facing the outer circumferential surface of the stator core 32, and the duplicate layer 34D of the divisional insulators 34A and 34B is placed on a side surface of an inner circumferential side surface of the electric conductor of the inner end layer facing the inner circumferential surface of the stator core 32. Further, the divisional insulators 34A and 34B are protruded from each of the end surfaces of the stator core 32 in the axial direction by a predetermined length, so that each electric conductor is placed so as to be away from the end surfaces of the stator core 32 by the predetermined length or more.

As described above, each insulator 34 arranged in the stator 3 is configured by the divisional insulators 34A and 34B overlapping each other at two positions of the periphery of the four electric conductors of the corresponding slot 35. Therefore, even though the insulator 34 is pushed and forced to be spread in the circumferential direction by bending the corresponding segment conductors 33, denoting the four electric conductors protruded from one side surface of the stator core 32, in the circumferential direction, the duplicate layers 34C and 34D of the divisional insulators 34A and 34B are shifted so as to spread the insulator 34 while absorbing a pushing force added on the insulator 34. Accordingly, the breakage of the insulator 34 can be prevented. Further, because the end portions of the divisional insulators 34A and 34B overlapping each other in each of areas of the duplicate layers 34C and 34D are merely shifted without forming an open area of the insulator 34, the four electric conductors are still surrounded by the insulator 34. Accordingly, no segment conductor 33 facing the stator core 32 through the duplicate layer 34C or 34D approaches the stator core 32, no segment conductor 33 is short-circuited with the stator core 32, and the electric insulation between the segment conductor 33 and the stator core 32 can be secured.

Particularly, because each insulator 34 is formed out of the divisional insulators 34A and 34B denoting two sheet members separated from each other in the duplicate layers 34C and 34D, the insulator 34 configured by combining the two sheet members and inserted into one slot 35 can be easily produced. Accordingly, the stator 3 of the on-vehicle AC generator 1 can be easily manufactured because of the simplification of the shape of parts of the insulator 34, and the cost of parts of the stator 3 can be reduced.

Moreover, each electric conductor of the segment conductors 33 is formed in a rectangular shape in section, and the duplicate layers 34C and 34D of the insulator 34 of each slot 35 are placed at two positions (a position facing the inner circumferential surface and a position facing the outer circumferential surface) which almost equally partitions a periphery surface of the four electric conductors inserted into the slot 35 into two. Therefore, lengths of the divisional insulators 34A and 34B separated from each other in the duplicate layers 34C and 34D are the almost same as each other. Accordingly, when the electric conductors are bent, the end portions of the divisional insulators 34A and 34B overlapping each other in the duplicate layers 34C and 34D can be shifted by the almost same distance as each other, and the breakage of the insulator 34 can be further prevented. Further, because the divisional insulators 34A and 34B can be formed in the same shape as each other, the divisional insulators 34A and 34B can be easily produced.

Furthermore, the duplicate layers 34C and 34D of the divisional insulators 34A and 34B are placed on the periphery surfaces of the electric conductors of each slot 35 facing the inner and outer circumferential surfaces of the stator core 32. Accordingly, when the electric conductors of the slot 35 are bent in the circumferential direction, the divisional insulators 34A and 34B can be equally pushed so as to spread the insulator 34 in the circumferential direction.

Second Embodiment

Figure 6:
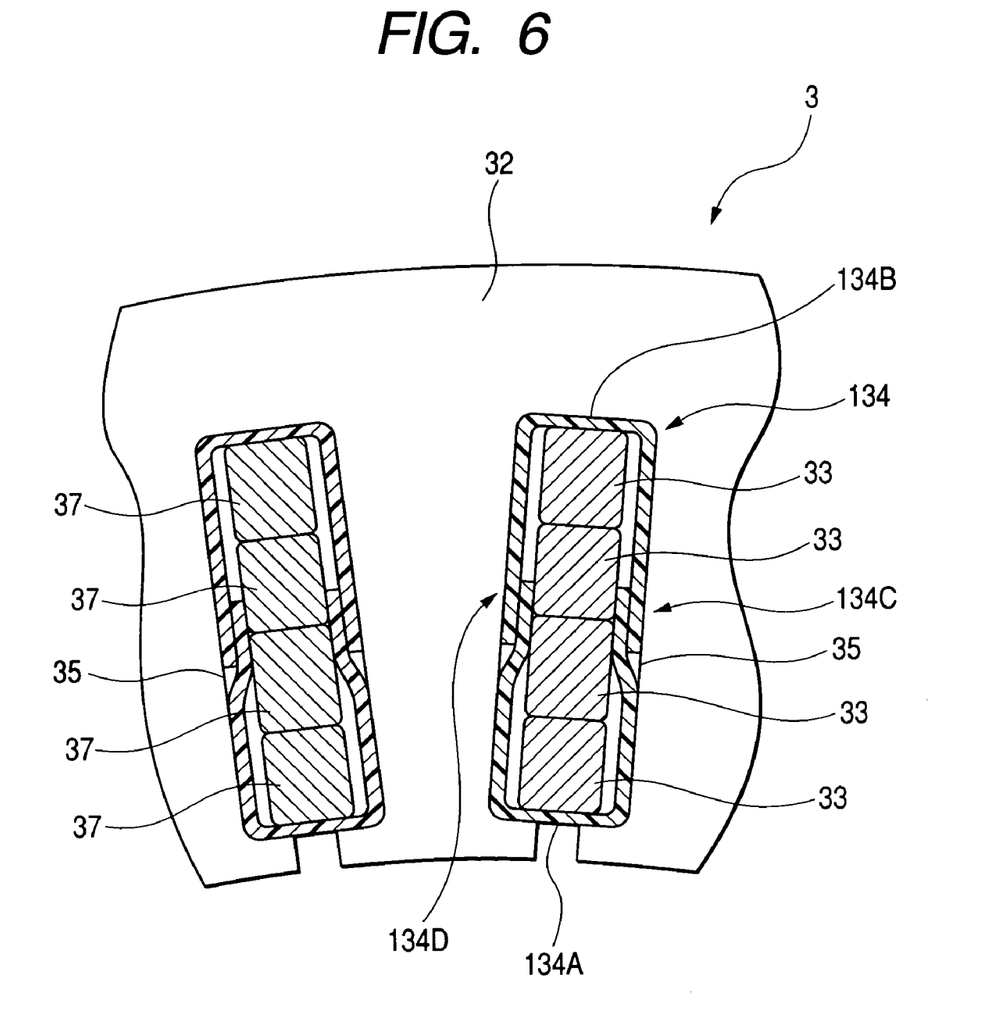
FIG. 6 is a partial sectional view of a stator according to a second embodiment.

In the first embodiment, the divisional insulators 34A and 34B of each slot 35 are laid to overlap each other in the neighborhood of the open area of the slot 35 and on the outermost circumferential side. However, in a second embodiment, the divisional insulators 34A and 34B are laid to overlap each other on each of side surfaces of the slot 35 in the circumferential direction of the stator core 32.

Figure 7:
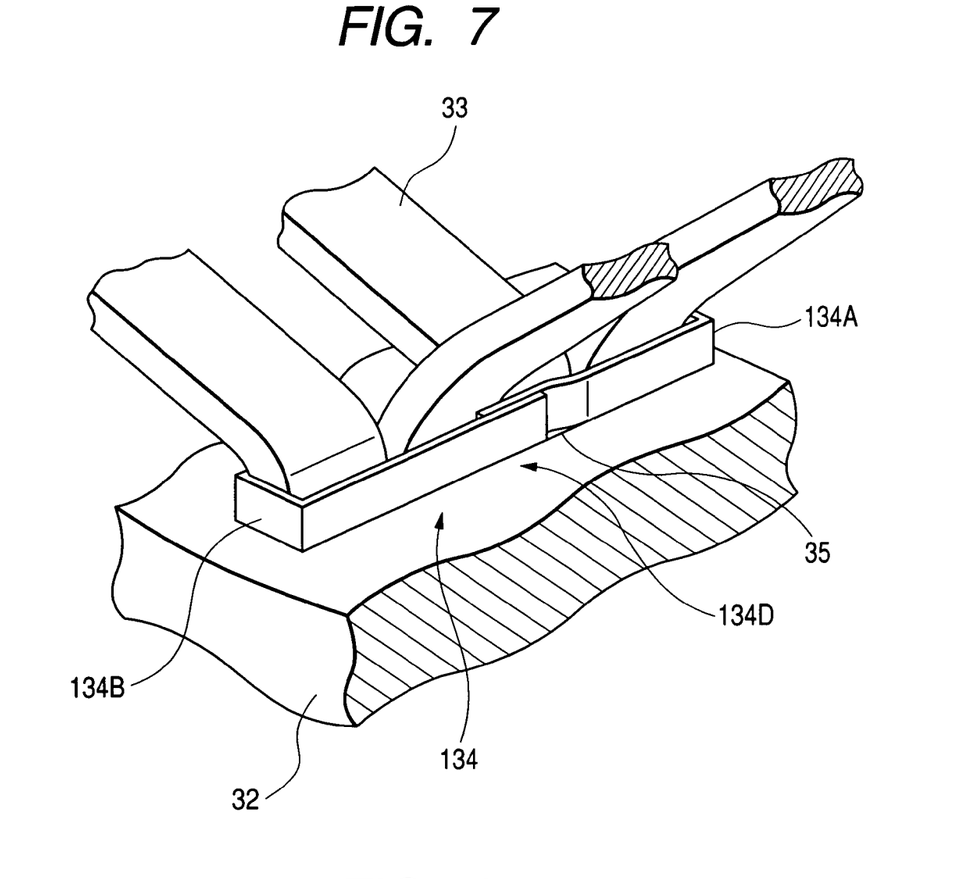
FIG. 7 is a partial perspective side view showing a shape of an insulator protruded from the stator core.

FIG. 6 is a partial sectional view of the stator 3 according to the second embodiment. FIG. 7 is a partial perspective side view showing a shape of an insulator protruded from the stator core 32.

An insulator 134 of each slot 35 according to the second embodiment is configured by combining two divisional insulators 134A and 134B separated from each other in the almost center of each of side surfaces of the slot 35 in the circumferential direction. Each of the divisional insulators 134A and 134B is formed in a C-shape so as to have one straight intermediate portion between two straight end portions. The divisional insulator 134A covers the electric conductor of the inner end layer, the electric conductor of the inner intermediate layer and a part of the electric conductor of the outer intermediate layer near to the inner circumferential surface of the stator core 32. The divisional insulator 134B covers the electric conductor of the outer end layer, the electric conductor of the outer intermediate layer and a part of the electric conductor of the inner intermediate layer near to the outer circumferential surface of the stator core 32. Therefore, the divisional insulators 134A and 134B are laid to overlap each other in duplicate layers 134C and 134D of the divisional insulators 134A and 134B. The duplicate layers 134C and 134D are placed in the neighborhood of the boundary between the electric conductor of the inner intermediate layer and the electric conductor of the outer intermediate layer in the circumferential directions of the stator core 32. Further, as shown in FIG. 7, the divisional insulators 134A and 134B are protruded from each of the end surfaces of the stator core 32 in the axial direction by a predetermined length. Therefore, each electric conductor is placed so as to be away from the end surfaces of the stator core 32 by the predetermined length or more.

As described above, even though the insulator 134 of one slot 35 is pushed and forced to be spread in the circumferential direction by bending the corresponding segment conductors 33, denoting the four electric conductors protruded from one side surface of the stator core 32, in the circumferential direction, the duplicate layers 134C and 134D of the divisional insulators 134A and 134B, which are placed in the almost center of the side surfaces of the slot 35 in the circumferential direction, are shifted so as to spread the insulator 134 while absorbing a pushing force added on the insulator 134. Accordingly, the breakage of the insulator 134 can be prevented. Further, because the end portions of the divisional insulators 134A and 134B overlapping each other in the areas of the duplicate layers 134C and 134D are merely shifted without forming an open area of the insulator 134, the electric conductors of the slot 35 are still surrounded by the insulator 134. Accordingly, no segment conductor 33 facing the stator core 32 through the duplicate layer 134C or 134D approaches the stator core 32, no segment conductor 33 is short-circuited with the stator core 32, and the electric insulation between the segment conductor 33 and the stator core 32 can be secured.

The present invention is not limited to the first and second embodiments, and it will be appreciated that modifications may be made to the embodiments without departing from the scope of the invention. For example, in the first embodiment, the two divisional insulators 34A and 34B are laid to overlap each other in the duplicate layers 34C and 34D. However, al least one of the duplicate layers 34C and 34D (or the duplicate layers 134C and 134D in the second embodiment) may be replaced with a duplicate layer 34E (or a duplicate layer in the second embodiment) in which one of the divisional insulators 34A and 34B is folded even-numbered times.

Figure 8:
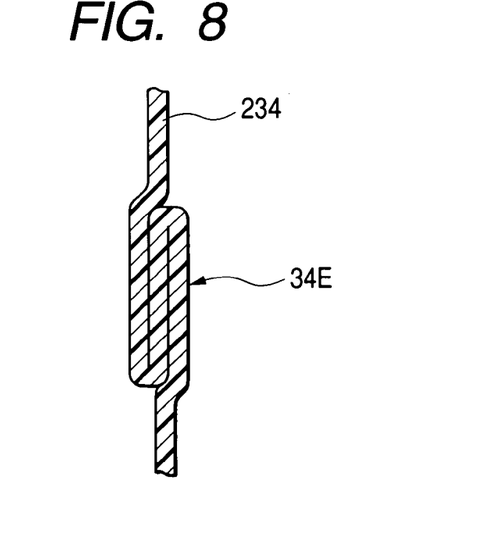
FIG. 8 is a sectional view of a duplicate layer of an insulator formed by folding one sheet member twice according to a modification.

FIG. 8 is a sectional view of the duplicate layer 34E formed by folding one sheet member twice. As shown in FIG. 8, the duplicate layer 34E is formed by folding back a portion of an insulator 234 twice by a predetermined length. Therefore, even though the insulator 234 is pushed and forced to be spread in the circumferential direction by bending the segment conductor 33 in the circumferential direction, the duplicate layer 34E of the insulator 234 is spread in the circumferential direction so as to absorb a pushing force of the segment conductor 33.

Accordingly, the insulator 234 is not broken, no segment conductor 33 is short-circuited with the stator core 32, and the electric insulation between the segment conductor 33 and the stator core 32 can be secured.

In the embodiments and modification, the insulators 34, 134 and 234 included in the stator 3 of the on-vehicle AC generator 1 are described. However, the present invention can be applied to any insulator included in a stator of a dynamo-electric machine other than an on-vehicle AC generator.

Further, in the embodiments, the insulator 34 or 134 inserted into each slot 35 is configured by combining two divisional insulators. However, the insulator 34 or 134 inserted into each slot 35 may be configured by combining three divisional insulators or more. In this case, each duplicate layer of the divisional insulators is obtained by laying end portions of two divisional insulators adjacent to each other to place one on top of another.

What is claimed is:

1. A dynamo-electric machine's stator, comprising:
a stator core having a plurality of slots which are arranged in a line along a circumferential direction of the stator core;
a plurality of electric conductors inserted into the slots of the stator core so as to be protruded from an end surface of the stator core in an axial direction of the stator core, portions of the electric conductors protruded from the end surface of the stator core being bent in the circumferential direction; and
an electric insulating member which is arranged between an inner wall of each slot of the stator core and a peripheral surface of the corresponding electric conductor so as to surround the electric conductor along a circumferential direction and has at least two duplicate layers, respectively, placed at different positions along the circumferential direction, each duplicate layer being configured by a plurality of overlapping portions of the electric insulating member overlapping each other at the corresponding position.

2. The dynamo-electric machine's stator according to claim 1, wherein each electric insulating member comprises a plurality of sheet members separated from one another at positions of the duplicate layers.

3. The dynamo-electric machine's stator according to claim 1, wherein each duplicate layer of each electric insulating member is formed by folding a sheet member.

4. The dynamo-electric machine's stator according to claim 1, wherein the electric conductor inserted into each slot of the stator core is formed in a rectangular shape in section, and the two duplicate layers of the electric insulating member of the slot are placed at positions at which the peripheral surface of the electric conductor is equally divided into two.

5. The dynamo-electric machine's stator according to claim 1, wherein the duplicate layers of each electric insulating member are placed at positions respectively facing an inner circumferential surface of the stator core and an outer circumferential surface of the stator core.

6. The dynamo-electric machine's stator according to claim 1, wherein the electric conductors are connected to each other on both sides of the stator core in the axial direction to form a wiring.

* * * * *